(12) United States Patent
Romig et al.

(10) Patent No.: US 9,284,888 B2
(45) Date of Patent: Mar. 15, 2016

(54) SYSTEM FOR SUPPLYING FUEL TO LATE-LEAN FUEL INJECTORS OF A COMBUSTOR

(75) Inventors: Bryan Wesley Romig, Simpsonville, SC (US); Lucas John Stoia, Taylors, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 995 days.

(21) Appl. No.: 13/455,429

(22) Filed: Apr. 25, 2012

(65) Prior Publication Data
US 2013/0283800 A1 Oct. 31, 2013

(51) Int. Cl.
| | |
|---|---|
| *F02C 7/22* | (2006.01) |
| *F23R 3/34* | (2006.01) |
| *F23R 3/06* | (2006.01) |
| *F23R 3/28* | (2006.01) |

(52) U.S. Cl.
CPC ... *F02C 7/22* (2013.01); *F23R 3/06* (2013.01); *F23R 3/286* (2013.01); *F23R 3/346* (2013.01)

(58) Field of Classification Search
CPC ............. F23R 3/346; F23R 3/34; F23R 3/54; F23R 3/28; F23R 3/283; F23R 3/286; F23R 3/06; F23D 14/62; F23D 14/64
USPC ......... 60/746; 239/418, 423, 424, 424.5, 456, 239/429, 430, 431, 433, 434, 601
See application file for complete search history.

(56) References Cited

U.S. PATENT DOCUMENTS

| | | | |
|---|---|---|---|
| 2,792,058 A * | 5/1957 | Thomas et al. | .................. 431/3 |
| 2,922,279 A | 1/1960 | Roberson et al. | |
| 3,377,803 A | 4/1968 | Prachar | |
| 3,934,409 A | 1/1976 | Quillevere et al. | |
| 4,040,252 A | 8/1977 | Mosier et al. | |
| 4,045,956 A | 9/1977 | Markowski et al. | |
| 4,112,676 A | 9/1978 | DeCorso | |
| 4,192,139 A * | 3/1980 | Buchheim | ....................... 60/739 |
| 4,253,301 A | 3/1981 | Vogt | |
| 4,288,980 A | 9/1981 | Ernst | |
| 4,928,481 A | 5/1990 | Joshi et al. | |

(Continued)

FOREIGN PATENT DOCUMENTS

| | | |
|---|---|---|
| EP | 2236935 | 6/2010 |
| EP | 2206964 A2 | 7/2012 |

(Continued)

OTHER PUBLICATIONS

Co-pending U.S. Appl. No. 13/417,405, Chen et al., filed Mar. 12, 2012.

(Continued)

*Primary Examiner* — Phutthiwat Wongwian
*Assistant Examiner* — Rene Ford
(74) *Attorney, Agent, or Firm* — Dority & Manning, PA

(57) ABSTRACT

A system for supplying fuel to a combustor includes a combustion chamber, a liner that circumferentially surrounds at least a portion of the combustion chamber, and a flow sleeve that circumferentially surrounds at least a portion of the liner. A tube provides fluid communication for a working fluid to flow through the flow sleeve and the liner and into the combustion chamber, and the tube includes a tube wall. A plurality of fuel ports through the tube wall provide fluid communication for fuel to flow through the tube wall and into the tube, and the fuel ports are non-circular.

18 Claims, 3 Drawing Sheets

(56) References Cited

U.S. PATENT DOCUMENTS

| | | | |
|---|---|---|---|
| 5,054,280 A | 10/1991 | Ishibashi et al. | |
| 5,099,644 A | 3/1992 | Sabla et al. | |
| 5,127,229 A | 7/1992 | Ishibashi et al. | |
| 5,285,628 A * | 2/1994 | Korenberg | 60/775 |
| 5,297,391 A | 3/1994 | Roche | |
| 5,321,948 A | 6/1994 | Leonard | |
| 5,450,724 A | 9/1995 | Kesseli et al. | |
| 5,450,725 A | 9/1995 | Takahara et al. | |
| 5,623,819 A | 4/1997 | Bowker et al. | |
| 5,749,219 A | 5/1998 | DuBell | |
| 5,974,781 A | 11/1999 | Correa et al. | |
| 6,047,550 A | 4/2000 | Beebe | |
| 6,178,737 B1 | 1/2001 | Lenertz et al. | |
| 6,192,688 B1 | 2/2001 | Beebe | |
| 6,253,538 B1 | 7/2001 | Sampath et al. | |
| 6,834,505 B2 | 12/2004 | Al-Roub et al. | |
| 6,868,676 B1 | 3/2005 | Haynes | |
| 6,925,809 B2 | 8/2005 | Mowill | |
| 6,935,116 B2 | 8/2005 | Stuttaford et al. | |
| 7,137,256 B1 | 11/2006 | Stuttaford et al. | |
| 7,162,875 B2 | 1/2007 | Fletcher et al. | |
| 7,237,384 B2 | 7/2007 | Stuttaford et al. | |
| 7,425,127 B2 | 9/2008 | Zinn | |
| 7,665,309 B2 | 2/2010 | Parker et al. | |
| 8,475,160 B2 | 7/2013 | Campbell et al. | |
| 8,516,820 B2 | 8/2013 | Ramier et al. | |
| 8,545,215 B2 | 10/2013 | Bhagat | |
| 8,707,707 B2 | 4/2014 | Venkataraman et al. | |
| 2005/0095542 A1 | 5/2005 | Sanders et al. | |
| 2005/0097889 A1 | 5/2005 | Pilatis et al. | |
| 2007/0022758 A1 | 2/2007 | Myers et al. | |
| 2007/0137207 A1 | 6/2007 | Mancini et al. | |
| 2009/0084082 A1 | 4/2009 | Martin et al. | |
| 2010/0018208 A1 | 1/2010 | Ritland | |
| 2010/0018209 A1 | 1/2010 | Ramier et al. | |
| 2010/0174466 A1 | 7/2010 | Davis, Jr. et al. | |
| 2010/0192579 A1 * | 8/2010 | Boardman et al. | 60/737 |
| 2010/0212324 A1 * | 8/2010 | Bronson et al. | 60/752 |
| 2010/0229557 A1 * | 9/2010 | Matsumoto et al. | 60/737 |
| 2010/0293956 A1 | 11/2010 | Nadkarni | |
| 2011/0056206 A1 | 3/2011 | Wiebe | |
| 2011/0067402 A1 | 3/2011 | Wiebe et al. | |
| 2011/0113783 A1 * | 5/2011 | Boardman et al. | 60/723 |
| 2011/0131998 A1 | 6/2011 | Nadkarni et al. | |
| 2011/0179803 A1 | 7/2011 | Berry et al. | |
| 2011/0265482 A1 * | 11/2011 | Parsania et al. | 60/740 |
| 2011/0289928 A1 * | 12/2011 | Fox et al. | 60/740 |
| 2011/0296839 A1 | 12/2011 | Van Nieuwenhuizen et al. | |
| 2012/0304648 A1 * | 12/2012 | Byrne et al. | 60/737 |
| 2013/0008169 A1 | 1/2013 | Belsom et al. | |
| 2013/0031783 A1 * | 2/2013 | DiCintio et al. | 29/890.02 |
| 2013/0031906 A1 * | 2/2013 | DiCintio et al. | 60/737 |
| 2013/0031908 A1 * | 2/2013 | DiCintio et al. | 60/752 |
| 2013/0067921 A1 * | 3/2013 | Hadley et al. | 60/746 |
| 2013/0167547 A1 * | 7/2013 | Stoia et al. | 60/772 |
| 2013/0174558 A1 * | 7/2013 | Stryapunin | 60/734 |

FOREIGN PATENT DOCUMENTS

| | | |
|---|---|---|
| EP | 2613082 | 10/2013 |
| JP | 2006138566 | 6/2006 |
| WO | WO 2004/035187 A2 | 4/2004 |

OTHER PUBLICATIONS

Co-pending U.S. Appl. No. 13/349,886, Stoia, et al., filed Jan. 13, 2012.
Co-pending U.S. Appl. No. 13/344,877, Stoia, et al., filed Jan. 6, 2012.
Co-pending U.S. Appl. No. 13/349,906, Stoia, et al., filed Jan. 13, 2012.
Co-pending U.S. Appl. No. 13/420,715, Chen, et al., filed Mar. 15, 2012.
Co-pending U.S. Appl. No. 13/455,480, Stoia, et al., filed Apr. 25, 2012.
Co-pending U.S. Appl. No. 14/122,694, Shershnyov, filed Nov. 27, 2013.
Co-pending U.S. Appl. No. 14/122,697, Shershnyov, filed Nov. 27, 2013.
Co-pending U.S. Appl. No. 14/466,184, Melton, et al., filed May 8, 2012.

* cited by examiner

SYSTEM FOR SUPPLYING FUEL TO LATE-LEAN FUEL INJECTORS OF A COMBUSTOR

FIELD OF THE INVENTION

The present invention generally involves a system for supplying fuel to a combustor. In particular embodiments, the present invention may supply a lean fuel-air mixture to the combustor through late lean injectors circumferentially arranged around a combustion chamber.

BACKGROUND OF THE INVENTION

Combustors are commonly used in industrial and power generation operations to ignite fuel to produce combustion gases having a high temperature and pressure. For example, gas turbines typically include one or more combustors to generate power or thrust. A typical gas turbine used to generate electrical power includes an axial compressor at the front, one or more combustors around the middle, and a turbine at the rear. Ambient air may be supplied to the compressor, and rotating blades and stationary vanes in the compressor progressively impart kinetic energy to the working fluid (air) to produce a compressed working fluid at a highly energized state. The compressed working fluid exits the compressor and flows into a combustion chamber where the compressed working fluid mixes with fuel and ignites to generate combustion gases having a high temperature and pressure. The combustion gases expand in the turbine to produce work. For example, expansion of the combustion gases in the turbine may rotate a shaft connected to a generator to produce electricity.

Various design and operating parameters influence the design and operation of combustors. For example, higher combustion gas temperatures generally improve the thermodynamic efficiency of the combustor. However, higher combustion gas temperatures also promote flashback or flame holding conditions in which the combustion flame migrates towards the fuel being supplied by fuel nozzles, possibly causing severe damage to the fuel nozzles in a relatively short amount of time. In addition, higher combustion gas temperatures generally increase the disassociation rate of diatomic nitrogen, increasing the production of nitrogen oxides ($NO_x$). Conversely, a lower combustion gas temperature associated with reduced fuel flow and/or part load operation (turndown) generally reduces the chemical reaction rates of the combustion gases, increasing the production of carbon monoxide and unburned hydrocarbons.

In a particular combustor design, one or more late lean injectors or tubes may be circumferentially arranged around the combustion chamber downstream from the fuel nozzles. Fuel may be injected through fuel ports in the tubes, and a portion of the compressed working fluid exiting the compressor may flow through the tubes to mix with the fuel to produce a lean fuel-air mixture. The lean fuel-air mixture may then flow through the tubes into the combustion chamber to produce additional combustion that raises the combustion gas temperature and increases the thermodynamic efficiency of the combustor.

The late lean injectors have proven to be effective at increasing combustion gas temperatures without producing a corresponding increase in the production of $NO_x$, and various efforts have been made to enhance the performance of the late lean injectors with varying success. For example, the number and/or size of the fuel ports have been increased to increase the amount of fuel that may be supplied through the late lean injectors. However, the additional and/or larger fuel ports reduce the penetration of the fuel inside the tubes and/or allow the injected fuel to coalesce inside the tubes which adversely impacts combustor emissions. Therefore, an improved system for supplying working fuel to the combustor would be useful.

BRIEF DESCRIPTION OF THE INVENTION

Aspects and advantages of the invention are set forth below in the following description, or may be obvious from the description, or may be learned through practice of the invention.

One embodiment of the present invention is a system for supplying fuel to a combustor. The system includes a combustion chamber, a liner that circumferentially surrounds at least a portion of the combustion chamber, and a flow sleeve that circumferentially surrounds at least a portion of the liner. A tube provides fluid communication for a working fluid to flow through the flow sleeve and the liner and into the combustion chamber, and the tube includes a tube wall. A plurality of fuel ports through the tube wall provide fluid communication for fuel to flow through the tube wall and into the tube, and the fuel ports are non-circular.

Another embodiment of the present invention is a system for supplying fuel to a combustor that includes a combustion chamber, a liner that circumferentially surrounds at least a portion of the combustion chamber, and a flow sleeve that circumferentially surrounds at least a portion of the liner. A first fluid flow path is through the flow sleeve and the liner and into the combustion chamber. A second fluid flow path intersects with the first fluid flow path, and a plurality of fuel ports at the intersection of the first and second fluid flow paths are non-circular.

The present invention may also include a system for supplying fuel to a combustor that includes a fuel nozzle, a combustion chamber downstream from the fuel nozzle, and a flow sleeve that circumferentially surrounds the combustion chamber. A plurality of fuel injectors circumferentially arranged around the flow sleeve provide fluid communication through the flow sleeve and into the combustion chamber. A plurality of fuel ports circumferentially arranged around each fuel injector provide fluid communication for fuel to flow into each fuel injector, and the fuel ports are non-circular.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
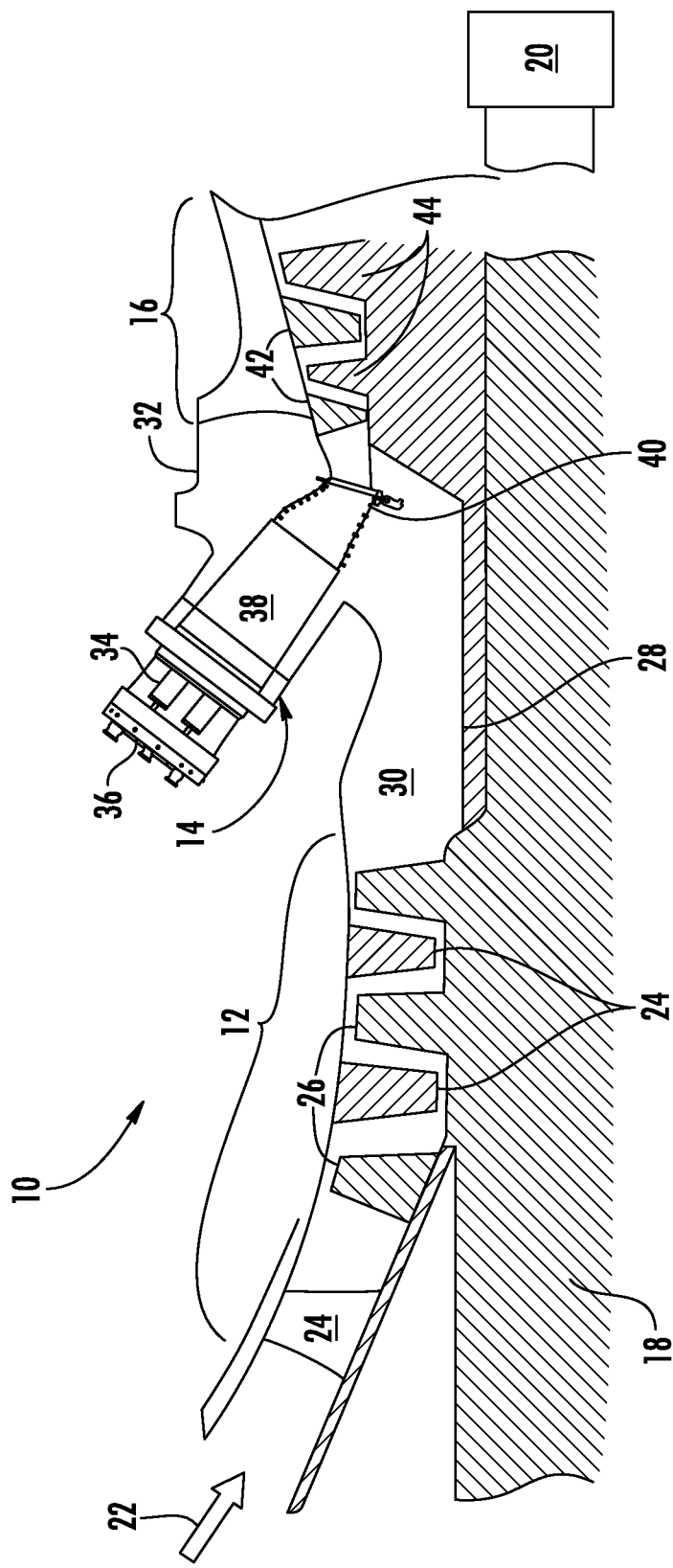
FIG. 1 is a simplified side cross-section view of an exemplary gas turbine.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system for supplying fuel to a combustor. The system generally includes one or more late lean injectors circumferentially arranged around a combustion chamber to inject a lean mixture of fuel and working fluid into the combustion chamber. Each late lean injector generally includes a plurality of noncircular fuel ports that provide fluid communication for fuel to flow into each injector. In particular embodiments, the fuel ports may have one or two axes of symmetry and may be shaped like an oval, a racetrack, or a tear drop. Although exemplary embodiments of the present invention will be described generally in the context of a combustor incorporated into a gas turbine for purposes of illustration, one of ordinary skill in the art will readily appreciate that embodiments of the present invention may be applied to any combustor and are not limited to a gas turbine combustor unless specifically recited in the claims.

FIG. 1 provides a simplified cross-section view of an exemplary gas turbine 10 that may incorporate various embodiments of the present invention. As shown, the gas turbine 10 may include a compressor 12 at the front, one or more combustors 14 radially disposed around the middle, and a turbine 16 at the rear. The compressor 12 and the turbine 16 typically share a common rotor 18 connected to a generator 20 to produce electricity.

The compressor 12 may be an axial flow compressor in which a working fluid 22, such as ambient air, enters the compressor 12 and passes through alternating stages of stationary vanes 24 and rotating blades 26. A compressor casing 28 contains the working fluid 22 as the stationary vanes 24 and rotating blades 26 accelerate and redirect the working fluid 22 to produce a continuous flow of compressed working fluid 22. The majority of the compressed working fluid 22 flows through a compressor discharge plenum 30 to the combustor 14.

The combustor 14 may be any type of combustor known in the art. For example, as shown in FIG. 1, a combustor casing 32 may circumferentially surround some or all of the combustor 14 to contain the compressed working fluid 22 flowing from the compressor 12. One or more fuel nozzles 34 may be radially arranged in an end cover 36 to supply fuel to a combustion chamber 38 downstream from the fuel nozzles 34. Possible fuels include, for example, one or more of blast furnace gas, coke oven gas, natural gas, vaporized liquefied natural gas (LNG), hydrogen, and propane. The compressed working fluid 22 may flow from the compressor discharge plenum 30 along the outside of the combustion chamber 38 before reaching the end cover 36 and reversing direction to flow through the fuel nozzles 34 to mix with the fuel. The mixture of fuel and compressed working fluid 22 flows into the combustion chamber 38 where it ignites to generate combustion gases having a high temperature and pressure. The combustion gases flow through a transition piece 40 to the turbine 16.

The turbine 16 may include alternating stages of stators 42 and rotating buckets 44. The first stage of stators 42 redirects and focuses the combustion gases onto the first stage of rotating buckets 44. As the combustion gases pass over the first stage of rotating buckets 44, the combustion gases expand, causing the rotating buckets 44 and rotor 18 to rotate. The combustion gases then flow to the next stage of stators 42 which redirects the combustion gases to the next stage of rotating buckets 44, and the process repeats for the following stages.

Figure 2:
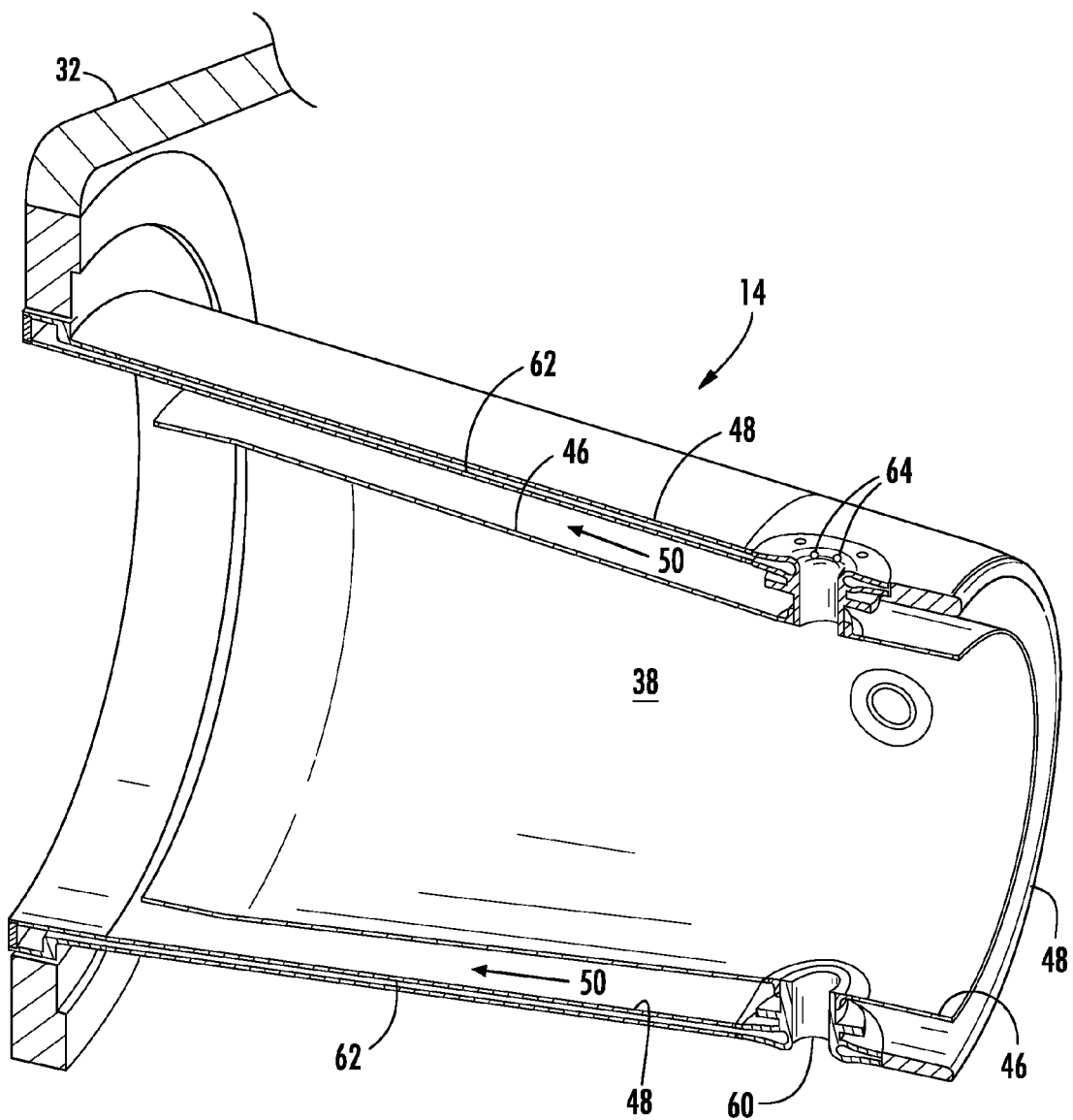
FIG. 2 is a simplified side perspective view of a portion of the combustor shown in FIG. 1.

FIG. 2 provides a simplified perspective view of a portion of the combustor 14 shown in FIG. 1. As shown, the combustor 14 may include a liner 46 that circumferentially surrounds at least a portion of the combustion chamber 38. A flow sleeve 48 may circumferentially surround at least a portion of the liner 46 to define an annular passage 50 that surrounds the liner 46. In this manner, the compressed working fluid 22 from the compressor discharge plenum 30 may flow through the annular passage 50 along the outside of the liner 46 to provide convective cooling to the liner 46 before reversing direction to flow through the fuel nozzles 34 (shown in FIG. 1) and into the combustion chamber 38.

The combustor 14 may further include a plurality of late lean injectors or tubes 60 that may provide a late lean injection of fuel and working fluid 22 into the combustion chamber 38. The tubes 60 may be circumferentially arranged around the combustion chamber 38, liner 46, and flow sleeve 48 downstream from the fuel nozzles 34 to provide fluid communication for at least a portion of the working fluid 22 to flow through the flow sleeve 48 and the liner 46 and into the combustion chamber 38. As shown in FIG. 2, the flow sleeve 48 may include an internal fuel passage 62, and each tube 60 may include one or more fuel ports 64 circumferentially arranged around the tube 60. The internal fuel passage 62 may supply the same or a different fuel to the fuel ports 64 than is supplied to the fuel nozzles 34. The fuel ports 64 may thus provide fluid communication for the fuel to flow into the tubes 60 to allow the fuel and working fluid 22 to mix while flowing through the tubes 60 and into the combustion chamber 38. In this manner, the tubes 60 may supply a lean mixture of fuel and working fluid 22 for additional combustion to raise the temperature, and thus the efficiency, of the combustor 14.

The number, size, and shape of the fuel ports 64 directly affect the ability of the late lean injectors 60 to increase combustion chamber 38 temperature without a corresponding increase in $NO_X$ emissions. For example, the number, size, and shape of the fuel ports 64 directly affect the flow rate, pressure, and penetration of the fuel flowing into the tubes 60. If the combined cross-sectional area of the fuel ports 64 is too large, then the fuel will not adequately penetrate into the tubes 60 to effectively mix with the working fluid 22 and produce the desired lean fuel-air mixture. In addition, an excessive cross-sectional area of the fuel ports 64 may result in inconsistent fuel flow through the various tubes 60 in each combustor 14, as well as between different combustors 14. Conversely, if the combined cross-sectional area of the fuel ports 64 is too small, then the fuel flow into the tubes 60 may be insufficient without requiring a substantial increase in the fuel supply pressure.

Computational fluid dynamic (CFD) modeling performed on various shapes of the fuel ports 64 indicates that the shape of the fuel ports 64 can change the effective cross-sectional area of the fuel ports 64 compared to the geometric cross-sectional area. Specifically, CFD modeling indicates that non-circular fuel ports 64 having the same geometric cross-sectional area as circular fuel ports 64 may have a larger effective cross-sectional area. The larger effective cross-sectional area allows the non-circular fuel ports 64 to achieve comparable fuel penetration and flow rates at a lower fuel supply pressure compared to the circular fuel ports 64. As a result, the non-circular fuel ports 64 may achieve better fuel penetration and flow rates at the same fuel supply pressure compared to the circular fuel ports 64.

Figure 3:
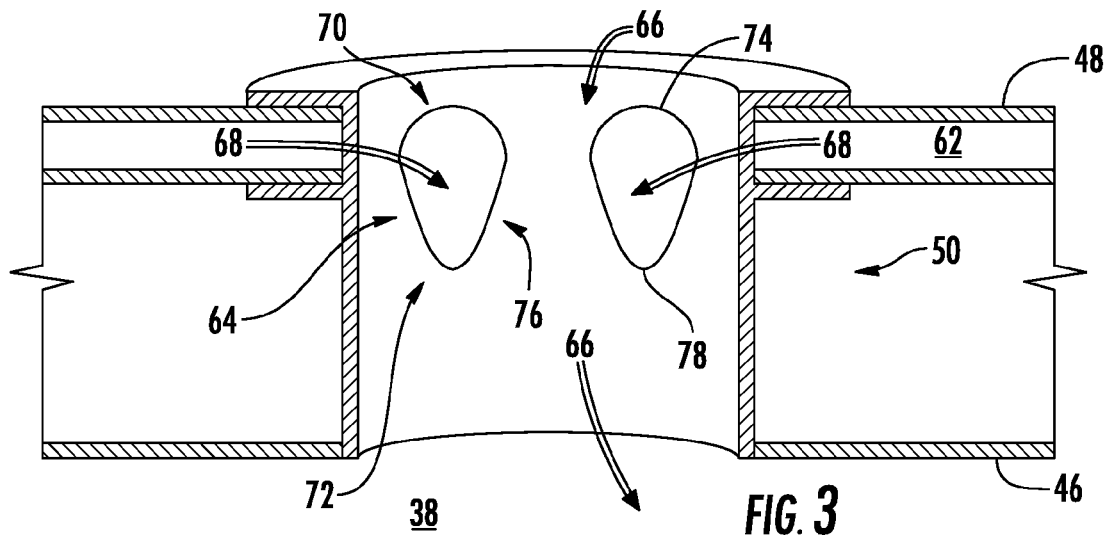
FIG. 3 is an enlarged side perspective view of the late lean injector shown in FIG. 2 according to a first embodiment of the present invention.
Figure 4:
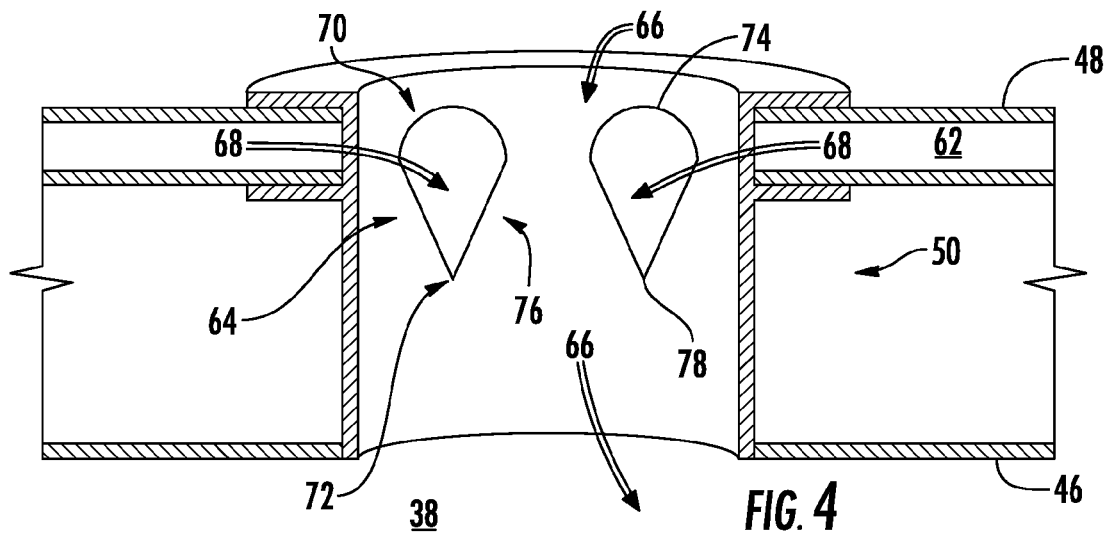
FIG. 4 is an enlarged side cross-section view of the late lean injector shown in FIG. 2 according to a second embodiment of the present invention.
Figure 5:
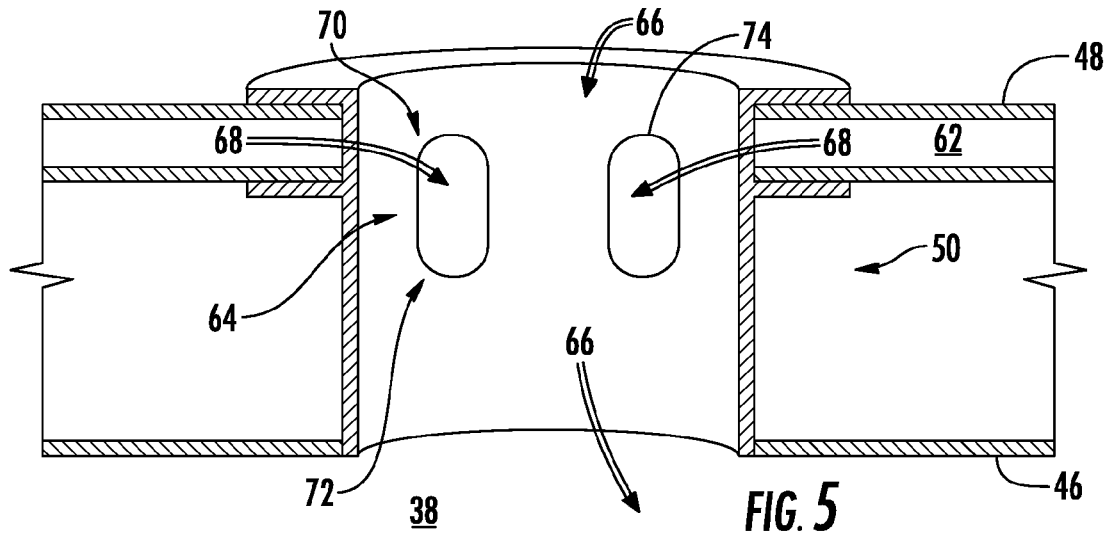
FIG. 5 is a plan view of the late lean injector shown in FIG. 2 according to a third embodiment of the present invention.

FIGS. 3-5 provide enlarged side perspective views of the late lean injector 60 shown in FIG. 2 according to various embodiments of the present invention. As shown in each figure, each tube 60 provides a first fluid flow path 66 for the working fluid 22 to flow through the flow sleeve 48 and the liner 46 and into the combustion chamber 38. In addition, the fuel ports 64 provide a second fluid flow path 68 for fuel to flow into the tubes 60 and intersect with the working fluid 22 in the first fluid flow path 66. Each fuel port 64 may include a first end 70 proximate to the flow sleeve 48 and a second end 72 opposite the first end 66 and proximate to the liner 46. In the particular embodiments shown in FIGS. 3-5, the first end 70 may have a generally constant radius 74, although the present invention is not limited as such unless specifically recited in the claims. Alternately or in addition, the fuel ports 64 may have a tapered width 76, as shown in FIGS. 3 and 4. In the particular embodiment shown in FIG. 4, the tapered width 76 may terminate at a vertex 78 so that the fuel port 64 has a tear drop shape. Alternately, as shown in FIG. 5, the second end 72 proximate to the liner 46 may have a generally constant radius 80 so that the fuel port 64 has an oval or race track shape.

One of ordinary skill in the art will readily appreciate from the teachings herein that embodiments within the scope of the present invention may include one or more than one of the fuel port 64 shapes described and illustrated in more detail in FIGS. 3-5, and embodiments of the present invention are not limited to any combination of such features unless specifically recited in the claims. The various non-circular shapes of the fuel ports 64 described herein may thus increase the effective cross-sectional area of the fuel ports 64 compared to circular fuel ports 64. As a result, the fuel ports 64 described herein may allow for improved efficiency without a corresponding increase in emissions over a wider temperature range in the combustor 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for supplying fuel to a combustor, comprising:
   a. a combustion chamber;
   b. a liner that circumferentially surrounds at least a portion of the combustion chamber;
   c. a flow sleeve that circumferentially surrounds at least a portion of the liner;
   d. a tube that extends radially through the flow sleeve and the liner and that provides fluid communication for a working fluid to flow through the flow sleeve and the liner and into the combustion chamber, wherein the tube includes an inlet radially spaced from an outlet and a tube wall that extends radially between the inlet and the outlet; and
   e. a plurality of fuel ports through the tube wall that provide fluid communication for fuel to flow through the tube wall and into the tube, wherein one or more of the fuel ports comprises an arcuate shaped first end disposed proximate to the inlet and two sides that converge from the first end towards the outlet of the tube and terminate at a second end.

2. The system as in claim 1, wherein each fuel port comprises an arcuate first end proximate to the flow sleeve, wherein each arcuate first end has a generally constant radius.

3. The system as in claim 1, wherein each fuel port comprises a second end, and the second end has a generally constant radius.

4. The system as in claim 1, wherein each fuel port has a tapered width.

5. The system as in claim 1, wherein each fuel port comprises a second end that terminates at a vertex.

6. The system as in claim 1, further comprising a fuel passage inside the flow sleeve in fluid communication with the tube.

7. A system for supplying fuel to a combustor, comprising:
   a. a combustion chamber;
   b. a liner that circumferentially surrounds at least a portion of the combustion chamber;
   c. a flow sleeve that circumferentially surrounds at least a portion of the liner;
   d. a first fluid flow path that extends radially through the flow sleeve and the liner and into the combustion chamber, wherein the fluid flow path is defined by a tube having an inlet defined proximate to the flow sleeve and an outlet defined proximate to the liner;
   e. a second fluid flow path that intersects with the first fluid flow path and which is defined between the flow sleeve and the liner; and
   f. a plurality of fuel ports at the intersection of the first and second fluid flow paths, wherein one or more of the fuel ports comprises an arcuate shaped first end disposed proximate to the inlet and two sides that converge from the first end towards the outlet of the tube and terminate at a second end.

8. The system as in claim 7, wherein each fuel port comprises an arcuate first end proximate to the flow sleeve, wherein each arcuate first end has a generally constant radius.

9. The system as in claim 8, wherein each fuel port comprises a second end, and the second end has a generally constant radius.

10. The system as in claim 8, wherein each fuel port has a tapered width.

11. The system as in claim 8, wherein each fuel port comprises a second end that terminates at a vertex.

12. The system as in claim 7, wherein the second fluid flow path is inside the flow sleeve.

13. A system for supplying fuel to a combustor, comprising:
   a. a fuel nozzle;
   b. a combustion chamber downstream from the fuel nozzle;
   c. a flow sleeve that circumferentially surrounds the combustion chamber;
   d. a plurality of fuel injectors circumferentially arranged around the flow sleeve and extending radially through the flow sleeve and the liner, wherein the plurality of fuel injectors provide fluid communication through the flow sleeve and into the combustion chamber; and
   e. a plurality of fuel ports circumferentially arranged around each fuel injector to provide fluid communication for fuel to flow into each fuel injector, wherein one or more of the fuel ports comprises an arcuate shaped first end disposed proximate to the inlet and two linear sides that extend from the first end towards the outlet of the tube and terminate at a second end.

14. The system as in claim 13, wherein each fuel port comprises an arcuate first end proximate to the flow sleeve, wherein each arcuate first end has a generally constant radius.

15. The system as in claim 13, wherein each fuel port comprises a second end, and the second end has a generally constant radius.

16. The system as in claim 13, wherein each fuel port has a tapered width.

17. The system as in claim 13, wherein each fuel port comprises a second end that terminates at a vertex.

18. The system as in claim 13, further comprising a fuel passage inside the flow sleeve in fluid communication with each fuel injector.

* * * * *